April 21, 1970     A. E. GREENWADE     3,507,969
AIRCRAFT PILOT TRAINING AID
Filed April 3, 1968     2 Sheets-Sheet 1
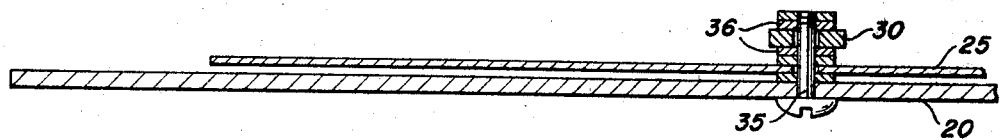
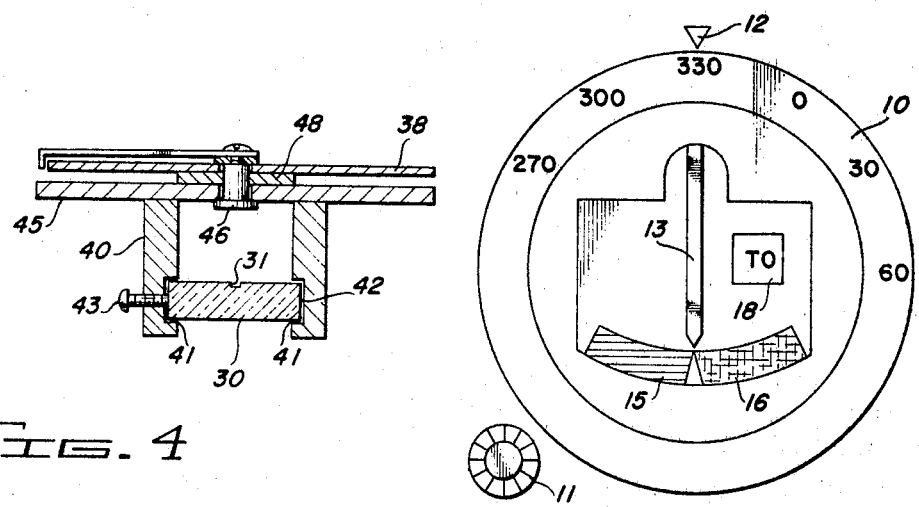
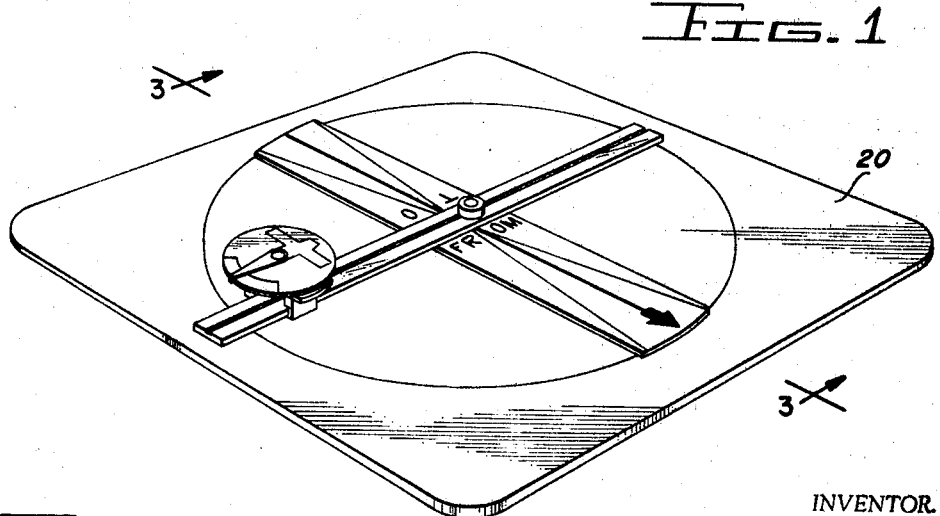
INVENTOR.
ALLAN F. GREENWADE
BY
Drummond & Cahill
ATTORNEYS April 21, 1970  A. E. GREENWADE  3,507,969
AIRCRAFT PILOT TRAINING AID
Filed April 3, 1968  2 Sheets-Sheet 2

INVENTOR.
ALLAN F. GREENWADE
BY
Drummond & Cahill
ATTORNEYS

United States Patent Office 3,507,969
Patented Apr. 21, 1970

3,507,969
AIRCRAFT PILOT TRAINING AID
Allan E. Greenwade, Phoenix, Ariz., assignor to A. J.
Post Company, Phoenix, Ariz., a partnership
Filed Apr. 3, 1968, Ser. No. 718,455
Int. Cl. G01c 21/00; G09b 9/08
U.S. Cl. 35—10.2                                      3 Claims

ABSTRACT OF THE DISCLOSURE

A support plate is utilized as a base having a pivot thereon representing an Omni station; compass degrees radiate from the Omni station and are marked on the support. A To/From marker is rotatably secured to the pivot and a support bar is rotatably secured to the pivot on top of the To/From marker. A disc having a representation of an aircraft thereon is rotatably and slidably secured to the support bar. The disc also includes a pointer pivotally secured thereto for representing the pointer of an aircraft-mounted Omni indicator.

The present invention pertains to training aids and, more specifically, to an aircraft pilot training aid for assisting in the instruction of pilots in the theory and use of the Omni system.

The utilization of the Omni system substantially throughout the country has given rise to a more widespread use of the system in private as well as commercial aircraft. Further, recent increases in the numbers of private pilots has brought to the attention of pilot instructors the inefficiency of present methods of instruction in the use of the Omni system. Characteristically, instructors attempt to describe the operation of an aircraft-mounted Omni instrument by relating the instrument readings to the position of an aircraft and the aircraft's position relative to an Omni station. Although the system, from a pilot's point of view, is very simple, the explanation of the system becomes complex, especially when only sketches and blackboard diagrams are utilized.

It is therefore an object of the present invention to provide a training aid to facilitate the instruction of the Omni system.

It is another object of the present invention to provide a training aid that will greatly facilitate the understanding of the Omni system and the operation of an aircraft-mounted Omni instrument and its relation to the aircraft and the Omni station.

These and other objects and advantages of the present invention will become apparent to those skilled in the art as the description thereof proceeds.

Briefly, in accordance with the embodiment chosen for illustration, a support plate is provided with a pivot and compass headings. A To/From marker is pivotally mounted to the plate and includes thereon localizer color cones. A support bar is also pivotally mounted on the plate and carries a disc with a representation of an aircraft thereon. The disc is rotatably and slidably supported on the bar so that it may be positioned in any desired location relative to the pivot point of the bar and support plate. A simulated Omni indicator is also placed on the disc so that the position of the aircraft relative to the Omni station, and the Omni indicator readings, may be correlated.

The present invention may more readily be described by reference to the accompanying drawings, in which:

FIGURE 1 is a schematic illustration of an aircraft-mounted Omni indicator.

FIGURE 2 is a perspective view of an aircraft pilot training aid constructed in accordance with the teachings of the present invention.

FIGURE 3 is a partial cross-sectional view of FIGURE 2 taken along line 3—3.

FIGURE 4 is an enlarged elevational view of a portion of the training aid of FIGURE 2.

Figure 5:
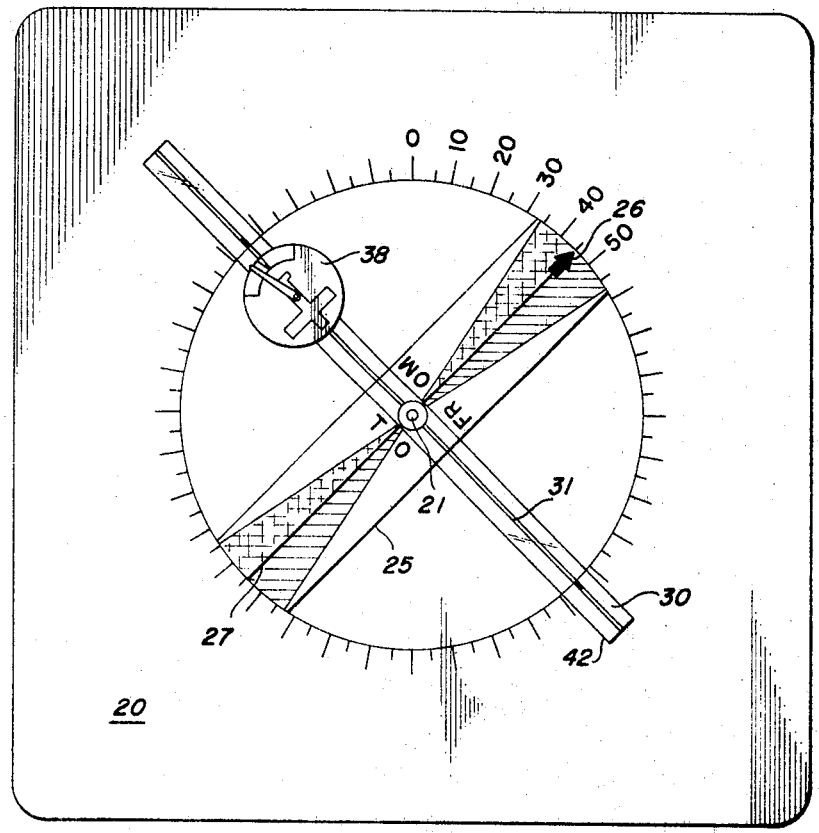
FIGURE 5 is a plan view of the training aid of FIGURE 2.
Figure 6:
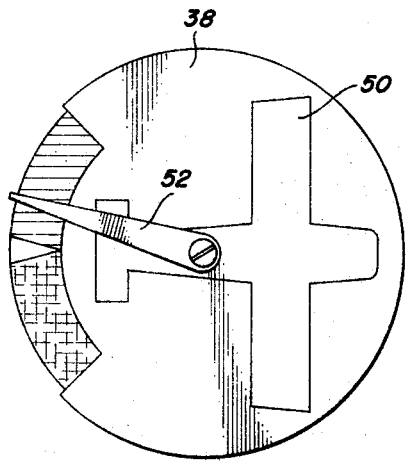
FIGURE 6 is an enlarged view of a portion of the training aid of FIGURE 2.

Without going into the technical details of the Omni system, it may briefly be described as the utilization of a plurality of transmitting stations, each having a fixed geographical location and each transmitting on a predetermined frequency. These Omni stations are strategically located throughout the country and may be identified by the transmission emanating from the station. The transmission from the Omni station is coded to permit an aircraft-mounted Omni receiver to distinguish between the case of an aircraft approaching the station and an aircraft receding from the station.

Referring to FIG. 1, a brief description will be given of the utilization of an Omni instrument such as shown therein. The instrument includes an Omni bearing selector 10 having degrees of the compass (0 through 360) thereon. The selector may be rotated such as by turning a knob 11 such that any desired magnetic compass heading on the selector may be aligned with a fixed pointer 12. The instrument includes a pointer 13 which will move right or left in a manner to be described later. Localizer colors are shown on the indicator face and are standardized as blue (shown at 15) and yellow (shown at 16). A window 18 is provided and will display either the word "To" or the word "From." The pilot turns the Omni receiver to an appropirate Omni frequency and the Omni bearing selector 10 is rotated until the pointer 13 is centered between the localizer colors 15 and 16. When the pointer 13 is centered, the pilot may then read the magnetic compass heading "To" or "From" the Omni station. As shown in FIGURE 1, the indicator shows the pilot that he is at a position on a radial extending "To" the Omni station of 330°.

Referring now to the training aid of the present invention, a support plate 20 is provided with a pivot 21 representing an Omni station and includes compass degrees marked on the support. A From/To marker 25 is rotatably secured to the pivot 21 and is thereby free to rotate and align an arrow head 26 affixed thereto with any compass degree on the plate 20. The To/From marker 25 also includes localizer color cones which extend radially from the pivot 21. The To/From marker also includes the words "TO" and "FROM."

A support bar 30 is provided and is rotatably mounted to the pivot 21. It will be obvious to those skilled in the art that the manner in which the respective elements are pivoted may greatly vary; however, FIGURE 3 shows a representative means for pivotally mounting the various elements which includes a threaded screw 35 passing through openings in the plate 20, To/From marker 25, and support bar 30. Bushings 36 are supplied to facilitate relative rotation between the elements.

A disc 38 is rotatably and slidably supported on the support bar 30. In the embodiment chosen for illustration, the disc 38 is secured to the support bar 30 by means of a frame 40 having grooves 41 for slidably engaging the edges 42 of the rod 30. A set screw 43 may be utilized to clamp the frame 40 at a desired location on support rod 30. The frame 40 includes a platform 45 for supporting a pivot pin 46 upon which the disc 38 is rotatably supported and spaced from the platform 45 by a bushing 48. The disc 38 includes a representation of an aircraft 50; the disc also includes localizer colors which, together with a pointer 52 pivotally secured to the disc, operate to form a simulated Omni indicator.

The operation of the training aid may be described as follows. The disc 38 with the representation of an aircraft thereon is positioned at any location relative to the pivot 21 (Omni station). The disc 38 may also be rotated to represent any directional heading of the aircraft; once the aircraft direction and position have been set, the sequence for using Omni may then be illustrated. First, to synthesize the dialing of the Omni bearing selector of an aircraft-mounted instrument, the To/From marker 25 is rotated until the line 27 between the localizer colors thereon is aligned iwth the support bar 30. The arrow 26 will then point to the appropriate magnetic heading To or From the Omni station. It may be noted that the To/From marker may assume either of two positions while the line 27 thereon is aligned with the support bar 30. In one position, the word "TO" may be read from the position of the aircraft and the magnetic compass heading indicated by the arrow 26 will therefore be the magnetic compass heading to the Omni station. Alternatively, if the To/From marker is rotated 180° so that the line 27 is again aligned with the support bar 30, the word "FROM" will be readable from the position of the aircraft and the arrow 26 will indicate the magnetic compass heading from the Omni station. The possibility of obtaining both a "To" and a "From" reading from the training aid exactly simulates the same possibility of an aircraft-mounted Omni indicator. It is obvious that a magnetic compass heading To a station is identical to a magnetic compass heading 180° displaced therefrom From a station. The localizer colors on the simulated Omni indicator positioned on the disc 38 readily illustrate to a student that when the To/From marker is not exactly aligned with the support bar 30 (e.g., extends into the blue localizer color), the simulated Omni indicator pointer 52 will increasingly be off center (extend into the blue.)

The training aid permits the demonstration of a number of situations and in each case visually demonstrates the inter-relationship between the aircraft, the Omni station, and the aircraft-mounted Omni indicator. For example, when the aircraft is flying to the station and deviates slightly from the radial extending from the station to the aircraft, the relationship of the aircraft direction and the localizer color may be made immediately obvious through the relative positioning of the To/From marker and the support bar while the aircraft-mounted Omni indicator reading is accurately simulated.

While it is obvious to those skilled in the art that a variety of materials may be utilized to construct the training aid of the present invention, I have found it convenient to use an opaque support plate 20 and transparent To/From marker and support bar. In this manner, the localizer colors on the To/From marker are readily visible to the class and may be viewed through the transparent support bar, thus facilitating the alignment of the support bar and the line 27 on the To/From marker between the localizer colors. I have also found that the alignment of the To/From marker and the support bar may be facilitated by inscribing a shallow groove in the support bar 30, as shown in the drawings at 31. It will also be obvious to those skilled in the art that many modifications may be made in the present invention without departing from the spirit and scope thereof; it is therefore intended that the present invention be limited only by the scope of the claims appended hereto.

I claim:

1. An aircraft pilot training aid for instructing pilots in the theory and use of the Omni system, comprising: a support plate having a pivot representing an Omni station thereon and having compass degrees radiating from said pivot marked on said support; a To/From marker rotatably secured to said pivot and having a mark thereon for registering with a compass heading; a support bar rotatably secured to said pivot; means representing an aircraft rotatably and longitudinally secured to said support bar; and a simulated Omni indicator secured to said means representing an aircraft to represent the position of a pointer of an Omni indicator.

2. The combination set forth in claim 1 wherein said To/From marker modules localizer colors extending radially from said pivot.

3. The combination set forth in claim 1 wherein said support plate is opaque and said To/From marker and support bar are transparent.

References Cited

UNITED STATES PATENTS

| 2,418,834 | 4/1947 | Hartman | 35—10.2 |
| 3,190,950 | 6/1965 | Ariesohn et al. | 35—10.2 |
| 3,364,297 | 1/1968 | Osborne | 35—12 X |

EUGENE R. CAPOZIO, Primary Examiner

P. V. WILLIAMS, Assistant Examiner

UNITED STATES PATENT OFFICE
CERTIFICATE OF CORRECTION

Patent No. 3,507,969                                                              April 21, 1970

Allan F. Greenwade

It is certified that error appears in the above identified patent and that said Letters Patent are hereby corrected as shown below:

In the heading to the drawings, sheets 1 and 2, "A. E. Greenwade" should read -- A. F. Greenwade --; in the heading to the printed specification, line 3, "Allan E. Greenwade" should read -- Allan F. Greenwade --.

Signed and sealed this 29th day of December 1970.

(SEAL)
Attest:

Edward M. Fletcher, Jr.
Attesting Officer

WILLIAM E. SCHUYLER, JR.
Commissioner of Patents